(12) United States Patent
Greca et al.

(10) Patent No.: US 8,439,363 B2
(45) Date of Patent: May 14, 2013

(54) DYNAMIC RADIAL SHAFT SEAL ASSEMBLY WITH COMBINATION DUST EXCLUSION THRUST PAD

(75) Inventors: Gerald A. Greca, Carleton, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 425 days.

(21) Appl. No.: 12/886,099

(22) Filed: Sep. 20, 2010

(65) Prior Publication Data
US 2012/0068416 A1 Mar. 22, 2012

(51) Int. Cl.
*F16J 15/32* (2006.01)
(52) U.S. Cl.
USPC .................... 277/353; 277/551; 277/572
(58) Field of Classification Search .......... 277/353, 277/551, 562, 572, 577
See application file for complete search history.

(56) References Cited

U.S. PATENT DOCUMENTS

| | | | |
|---|---|---|---|
| 3,156,474 A | 11/1964 | Nelson | |
| 3,685,841 A | 8/1972 | Keller | |
| 4,037,849 A | 7/1977 | Thumm | |
| 4,083,567 A | 4/1978 | Thumm | |
| 4,208,057 A | 6/1980 | Messenger | |
| 4,226,426 A * | 10/1980 | Messenger | 277/353 |
| 5,004,248 A | 4/1991 | Messenger et al. | |
| 5,183,269 A | 2/1993 | Black et al. | |
| 5,201,528 A * | 4/1993 | Upper | 277/394 |
| 5,997,005 A | 12/1999 | Gold et al. | |
| 6,170,833 B1 | 1/2001 | Cox et al. | |
| 6,186,507 B1 | 2/2001 | Oldenburg | |
| 6,193,264 B1 * | 2/2001 | Seon | 280/652 |
| 6,257,587 B1 | 7/2001 | Toth et al. | |
| 6,315,296 B1 | 11/2001 | Oldenburg | |
| 6,406,026 B1 | 6/2002 | Oldenburg | |
| 6,406,029 B1 | 6/2002 | Kupper et al. | |
| 6,450,503 B1 * | 9/2002 | Dossena et al. | 277/572 |
| 6,464,228 B1 | 10/2002 | Oldenburg | |
| 6,726,212 B2 | 4/2004 | Oldenburg | |
| 6,991,234 B2 | 1/2006 | Oldenburg | |
| 7,159,871 B2 | 1/2007 | Oldenburg | |
| 7,455,459 B2 | 11/2008 | Toth et al. | |
| 7,594,664 B2 | 9/2009 | Maskaliunas | |
| 7,658,386 B2 | 2/2010 | Oldenburg | |
| 2002/0175473 A1 | 11/2002 | Oldenburg | |
| 2007/0211974 A1 * | 9/2007 | Toth et al. | 384/448 |

(Continued)

FOREIGN PATENT DOCUMENTS
EP 0505793 A1 9/1992

*Primary Examiner* — Vishal Patel
(74) *Attorney, Agent, or Firm* — Robert L. Stearns; Dickinson Wright, PLLC

(57) ABSTRACT

A dynamic radial shaft seal assembly includes an inner wear sleeve having a cylindrical inner wall with a bore sized for receipt about a shaft and an outer running surface. The inner wear sleeve has a flange extending radially outwardly from the running surface. The assembly further includes an outer case having cylindrical outer wall configured for receipt in a housing and a rim extending radially inwardly from the outer wall. An elastomeric body is attached to the rim. The elastomeric body includes a main seal lip configured to engage the outer running surface of the inner wear sleeve and a plurality of thrust pads extending axially from the rim for engagement with the flange. The thrust pads are spaced circumferentially from one another by gaps. The elastomeric body further includes a first dust exclusion lip extending axially from the leg and bridging the gaps.

11 Claims, 3 Drawing Sheets

U.S. PATENT DOCUMENTS

| | | |
|---|---|---|
| 2007/0290451 A1 | 12/2007 | Yager |
| 2008/0054572 A1 * | 3/2008 | Maskaliunas ................ 277/551 |
| 2008/0128997 A1 | 6/2008 | Berdichevsky et al. |
| 2010/0072709 A1 | 3/2010 | Maskaliunas |

* cited by examiner

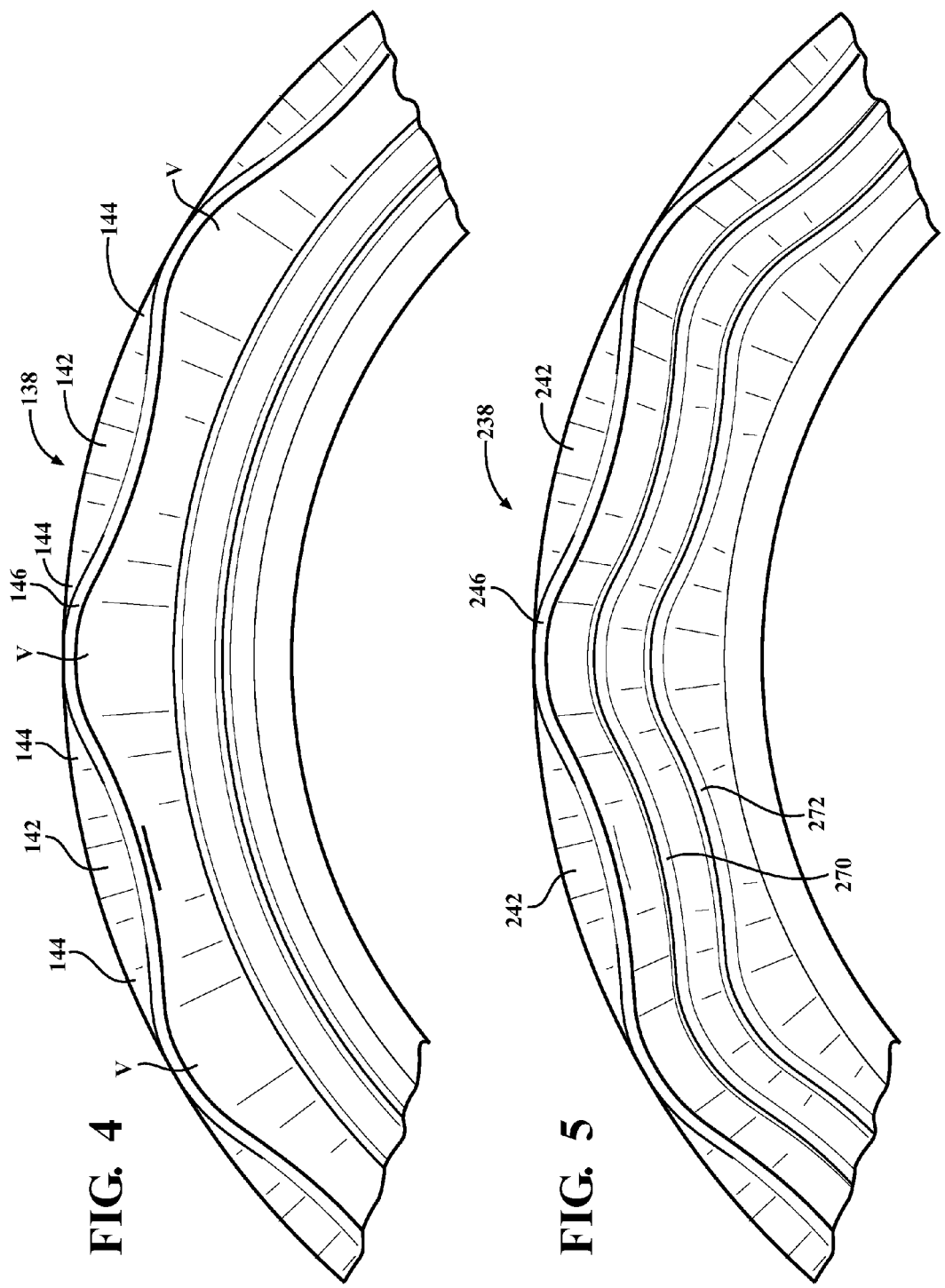

DYNAMIC RADIAL SHAFT SEAL ASSEMBLY WITH COMBINATION DUST EXCLUSION THRUST PAD

BACKGROUND OF THE INVENTION

1. Technical Field

This invention relates generally to dynamic radial shaft seals, and more particularly to dynamic radial shaft seals having axially extending dust exclusion lips and thrust pads.

2. Related Art

Dynamic radial shaft seals often include an annular outer seal component and an annular inner seal component. The outer seal component is configured to be mounted in a housing about an opening to be sealed and the inner seal component, including a wear sleeve, is configured to be mounted on and rotateable with a shaft extending through the opening. The outer seal component typically includes an outer metal case having a metal cylindrical portion sized for press fit into the housing with a leg extending radially inwardly from the cylindrical portion. Further, an elastomeric body is typically attached to the leg, with a main seal lip of the elastomeric body extending radially inwardly from an end of the leg to abut and provide a seal against a cylindrical running surface of the wear sleeve. Further, the elastomeric body typically includes one or more dust exclusion lips to prevent dust and other contamination from reaching and by-passing the main seal lip. The dust exclusion lips can be configured to ride against the cylindrical running surface of the wear sleeve and also to ride against a flange of the wear sleeve that extends radially outwardly from the wear sleeve cylindrical running surface. In addition to the main seal lip and the dust exclusion lips, it is known to provide a separate thrust pad between the leg of the metal case and the flange of the wear sleeve. Typically, the thrust pad is oriented radially outwardly from one or more of the dust exclusion lips. As such, the radial envelope of the seal assembly is necessarily increased to accommodate the thrust pad, or one or more of the dust exclusion lips are removed, which in turn, reduces the potential to inhibit the ingress of dust and other contamination.

SUMMARY OF THE INVENTION

In accordance with one aspect of the invention, a dynamic radial shaft seal assembly is provided. The assembly includes an inner wear sleeve having a cylindrical inner wall having a bore sized for receipt about a shaft and an outer wear surface. The inner wear sleeve has a flange extending radially outwardly from the inner wall. The assembly further includes an outer case having cylindrical outer wall configured for receipt in a housing and a rim extending radially inwardly from the outer wall. An elastomeric body is attached to the rim. The elastomeric body includes a main seal lip configured to engage the outer wear surface of the inner wear sleeve and a plurality of thrust pads extending axially from the rim for engagement with the flange. The thrust pads are spaced circumferentially from one another by gaps. The elastomeric body further includes a first dust exclusion lip extending axially from the leg and bridging the gaps between said thrust pads.

Accordingly, the assembly provides an ability to endure thrust forces without damaging important seal lips and dust exclusion lips, while at the same time providing a barrier to the ingress of dust and other contamination into the assembly and maintaining oil on an oil side of the assembly. Further, the combined and integrally formed thrust pads and dust exclusion lip provide the assembly with a radially compact dynamic sealing solution, thereby minimized the radial envelope needed to house the seal assembly. In addition, the assembly is robust, results in low friction in use, is economical in manufacture and in use, and exhibits a long an useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 4 is a partial front view similar to FIG. 2 of an elastomeric seal portion having a combination dust exclusion lip and thrust pad constructed in accordance with another aspect of the invention; and FIG. 5 is a partial front view similar to FIG. 2 of an elastomeric seal portion having a combination dust exclusion lip and thrust pad constructed in accordance with yet another aspect of the invention.

DETAILED DESCRIPTION OF PRESENTLY PREFERRED EMBODIMENTS

Figure 1:
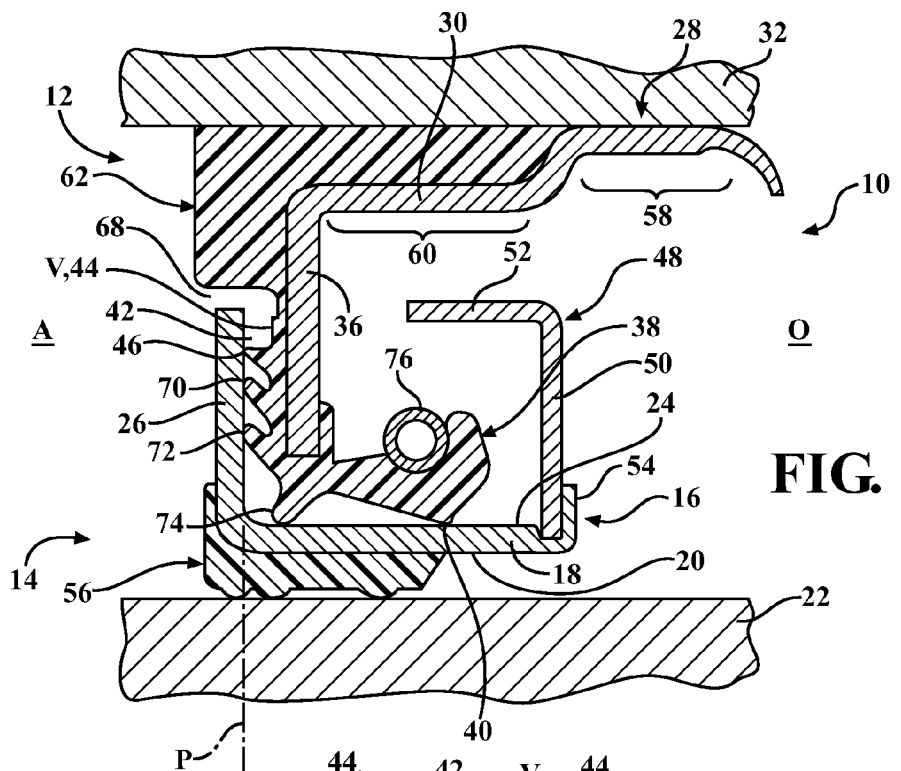
FIG. 1 is cross-sectional view taken generally along a central axis of a dynamic radial shaft seal assembly constructed in accordance with one aspect of the invention.

Referring in more detail to the drawings, FIG. 1 illustrates a dynamic radial shaft seal assembly, referred to hereafter as assembly 10, constructed in accordance with one aspect of the invention. The assembly 10 maintains lubricant, e.g. oil, on an oil side O of the assembly while preventing dust and other contamination on an air side A of the assembly from entering the oil side O. The assembly 10 includes an annular outer seal component 12 and an annular inner seal component 14. The inner seal component 14 includes an inner wear sleeve 16 having a cylindrical inner wall 18 including a bore 20 sized for receipt about a shaft 22 and a cylindrical outer running surface 24. Further, the wear sleeve 16 has an outer flange 26 extending radially outwardly from the running surface 24 at an air end of the inner wall 18 on the air side A of the assembly 10. The outer seal component 12 includes an annular outer carrier, also referred to as outer case 28, made of a rigid material, such as metal (e.g., steel), for example. The outer case 28 has a generally cylindrical outer wall 30 configured for fixed receipt in a housing 32, such as via press-fit or other mounting mechanism, in a bore 34 of the housing 32. The outer case 28 further has an annular flange, also referred to as leg or rim 36, extending radially inwardly from the cylindrical outer wall 30. An elastomeric body 38 is attached to the rim 36, such as by being molded or adhered directly thereto, for example. The elastomeric body 38 includes an annular main seal lip 40 configured to engage the outer running surface 24 of the wear sleeve 16 and a plurality of thrust pads 42 extending axially from the rim 36 for abutment with the flange 26, at least during assembly and under high thrust load conditions. The thrust pads 42 are spaced circumferentially from one another by circumferentially spaced valleys, also referred to as gaps 44, wherein the elastomeric body 38 further includes a first dust exclusion lip 46 extending axially from the flange 26 and bridging the gaps 44 between the thrust pads 42. Accordingly, the thrust pads 42 and the first dust exclusion lip 46 form a radially compact combination feature, given the thrust pads 42 and the first dust exclusion lip 46 lie along, or substantially along the same circular path with one another. The thrust pads 42 resist over-compression of the outer seal component 12 and the inner seal component 14 axially toward one another, such as during assembly, thereby ensuring the associated sealing features of the seal assembly 10 remain free of damage and function as intended in use. The first dust exclusion lip 46 acts to inhibit the ingress of dust and other contamination into the area of the main seal lip 40, thus, further ensuring the associated sealing features of the seal assembly 10 remain free of damage and function as intended in use.

The inner wear sleeve 16, by way of example and without limitation, is shown having an annular inner flange 48 extending from an oil end of the wear sleeve 10. The inner flange 48 is generally L-shaped in cross-section, having an upstanding leg 50 extending radially outwardly from the inner wall 18 in axially spaced and generally parallel relation to the outer flange 26. Further, the flange 48 has a cylindrical portion 52 reverse folded in overlying relation to the running surface 24 of the inner wall 18. Accordingly, the cylindrical portion 52 is radially aligned with a portion of the inner wall 18. The flange 48 is shown as being retained by a rolled or otherwise folded over lip 54. The wear sleeve 16 is further shown having an polymeric material 56 bonded within the bore 20, wherein the polymeric material 56 provides a fixed fit of the wear sleeve 16 on the shaft 22 such that the shaft 22 and the wear sleeve 16 rotate conjointly with one another. It should be recognized that the bore 20 could be sized for direct abutment with the outer surface of the shaft 22 if desired, thereby eliminating the polymeric material 56.

The outer wall 30 of the outer case 28 is shown having an annular step, such that an oil side portion of the outer wall 30 has an enlarged diameter portion 58 sized for a close, preferably line-to-line to tight fit within the bore 34 of the housing 32. Meanwhile, an air side portion of the outer wall 30 is stepped radially inwardly to a reduced diameter portion 60 to accommodate an outer elastomeric material 62, such as can be formed as a single piece of material with the elastomeric body 38, or separate therefrom, if desired. The outer elastomeric material 62 has an outer surface 64 configured for a tight fit within the bore 34 of the housing 32 and an annular air side nose 66 extending axially toward the air side A. The nose 66 extends toward the air side A axially beyond the rim 36 in slight radially spaced overlying relation to an end of the outer flange 26 to form a non-contact labyrinth passage 68 therebetween.

The elastomeric body 38 can be formed as a single piece of material with the outer elastomeric material 62, such as in a single insert molding operation, or separately therefrom. The elastomeric body 38 includes the radially inwardly extending main seal lip 40 configured for sealing engagement with the outer running surface 24 of the wear sleeve 16, the axially extending, circumferentially spaced thrust pads 42, the first dust exclusion lip 46 bridging the gaps 44 between the thrust pads 42, and additional features. The additional features include a secondary dust exclusion lip 70, a tertiary dust exclusion lip 72 and an auxiliary seal lip 74. The secondary and tertiary dust seal lips 70, 72 are spaced radially and in concentric relation to one another, wherein the secondary dust seal lip 70 is spaced radially inwardly from the first dust exclusion lip 46 and the tertiary dust exclusion lip 72 is spaced radially inwardly from the secondary dust exclusion lip 70. Each of the first, secondary and tertiary dust exclusion lips 46, 70, 72 are configured for engagement with the outer flange 26 to prevent dust and other contamination from ingress into the assembly 10, thereby preventing dust and contamination from coming into contact with the main seal lip 40. Further, the auxiliary seal lip 74 is located between the tertiary dust exclusion lip 72 and the main seal lip 40, wherein the auxiliary seal lip 74 is configured for engagement with the outer running surface 24 of the wear sleeve 16. To facilitate maintaining the main seal lip 40 in its sealing relation with the outer running surface 24, a spring member, such as a garter spring 76, can be used to bias the main seal lip 40 radially inwardly into abutment with the running surface 24.

Figure 2:
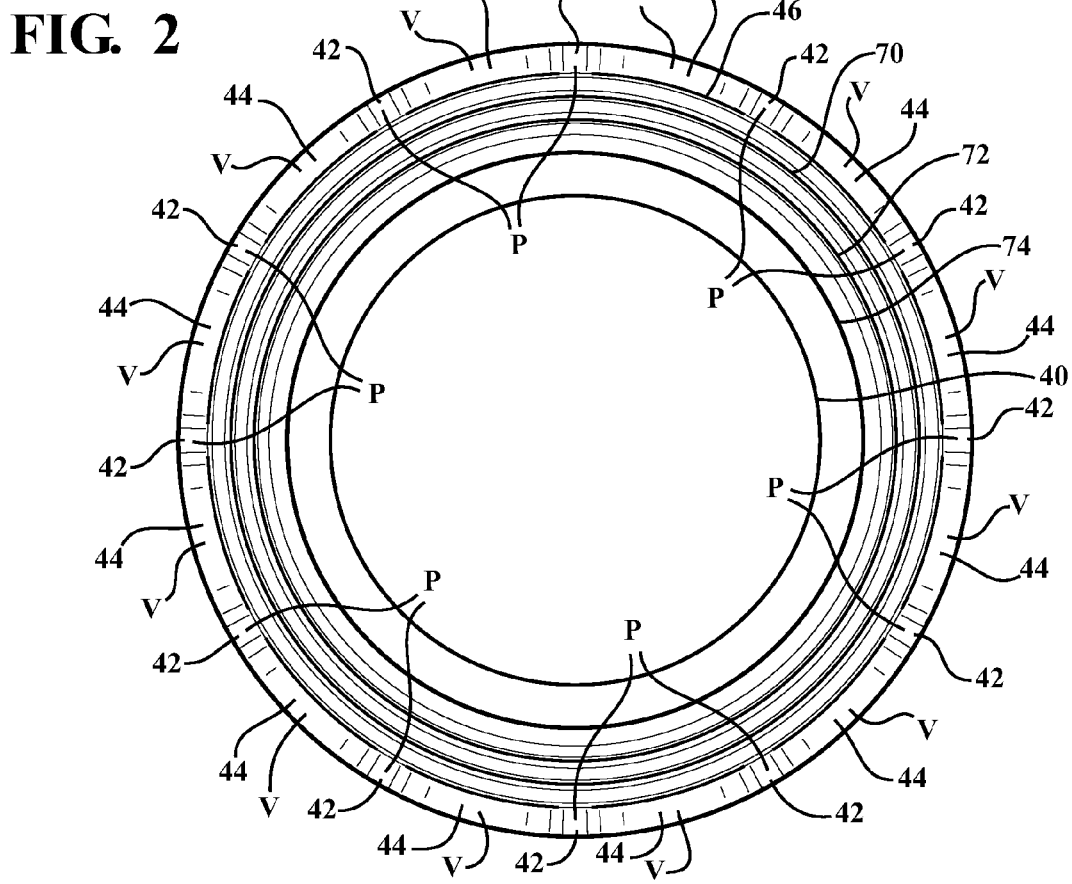
FIG. 2 is front view looking along the central axis of an elastomeric seal portion of the dynamic radial shaft seal assembly of FIG. 1 showing a combination dust exclusion lip and thrust pad constructed in accordance with one aspect of the invention.
Figure 3:
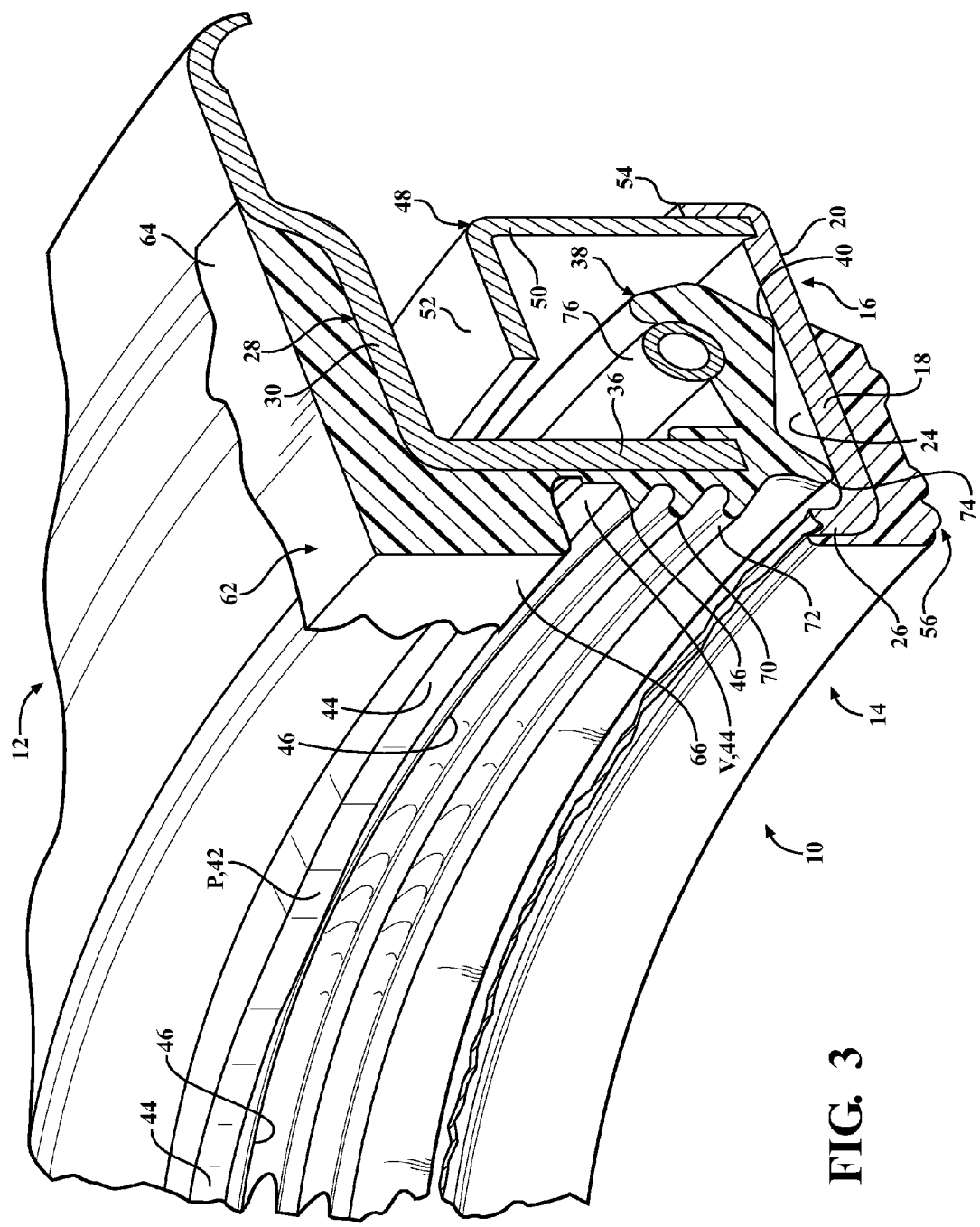
FIG. 3 is a partial perspective view of the dynamic radial shaft seal assembly of FIG. 1.

As best shown in FIG. 2, the thrust pads 42 are spaced circumferentially from one another by the gaps 44. The thrust pads 42 are formed by an axially facing surface that undulates in a generally smooth fashion axially inwardly and outwardly to form the desired number of thrust pads, shown here, by way of example, as twelve. Thus, peaks P of the undulating surface extending toward the air side A form thrust surfaces of the thrust pads 42, while valleys V extending axially inwardly toward the rim 36, and thus, toward the oil side O, form the gaps 44 which remain axially spaced from the outer flange 26. As such, the valleys V of the circumferentially extending undulating surfaces interconnect the thrust pads 42 with one another. In the region of the gaps 44, the circumferentially extending first dust exclusion lip 46 extends axially toward the air side A outwardly from and in radially alignment with the undulating surface for abutment with the outer flange 26, thereby inhibiting dust and other contamination from reaching the secondary dust exclusion lip 70. The first dust exclusion lip 46 merges with a radially innermost portion of each of the thrust pads 42, and thus, the thrust surfaces of the pads 42 extend radially outwardly from the first dust exclusion lip 46. The first dust exclusion lip 46 and the thrust surfaces of the thrust pads 42 can be formed flush or substantially flush with one another along a radially extending plane P. Otherwise, the first dust exclusion lip 46 can be formed to extend slightly axially beyond thrust surfaces of the thrust pads 42 toward the air side A, thereby forming the first dust exclusion lip 46 as a circumferentially continuous lip without interruption from the thrust pads 42. Thus, in normal use of the assembly 10, the thrust pads 42 could remain slightly spaced from the outer flange 26, while the first dust exclusion lip 46 makes a circumferentially continuous abutment with the outer flange 26, wherein the thrust pads 42 only come into contact with the outer flange 26 during a high thrust condition tending to bias the outer seal component 12 and the inner seal component 14 toward one another, such as during assembly, for example. As such, the thrust pads 42 can be made to remain spaced from the outer flange 26 during normal use, thereby minimizing friction. Of course, it should be recognized that if the thrust pads 42 are flush with the first dust exclusion lip 46, friction is reduced as a result of the thrust pads 42 being circumferentially discontinuous.

In FIG. 4, an elastomeric body 138 of a seal assembly constructed in accordance with another aspect of the invention is shown, wherein the same reference numerals as used above, offset by a factor of 100, are used to identify similar features.

The elastomeric body 138 is essentially the same as discussed above with regard to the elastomeric body 38, however, the configuration of a first dust exclusion lip 146 is modified from that discussed above. The first dust exclusion lip 146, rather than extending along a constant circular path, undulates over a circumferentially sinuous or generally sinuous path. Thus, as shown, in the regions of gaps 144 formed between adjacent thrust pads 142, the first dust exclusion lip 146 undulates within valleys V of the gaps 144. Accordingly, the first dust exclusion lip 146 undulates radially between adjacent thrust pads 142. Otherwise, the elastomeric body 138 is the same as discussed above with regard to the elastomeric body 38, and thus, is not discussed further.

In FIG. 5, an elastomeric body 238 of a seal assembly constructed in accordance with another aspect of the invention is shown, wherein the same reference numerals as used above, offset by a factor of 200, are used to identify similar features.

The elastomeric body 238 is essentially the same as discussed above with regard to the elastomeric body 138, wherein a first dust exclusion lip 246 undulates radially between adjacent thrust pads 242, however, the configuration of a secondary dust exclusion lip 270 and a tertiary dust exclusion lip 272, rather than extending along a constant circular path, are modified to undulate radially along the same path as the first dust exclusion lip 246. Thus, the first, secondary and tertiary dust exclusion lips 246, 270, 272 remain circumferentially uniformly spaced from one another as they undulate radially inwardly and outwardly. Otherwise, the elastomeric body 238 is the same as discussed above with regard to the elastomeric bodies 38, 138, and thus, is not discussed further.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A dynamic radial shaft seal assembly, comprising:
   an inner wear sleeve having a cylindrical inner wall including a bore sized for receipt about a shaft and an outer running surface, said inner wear sleeve having a flange extending radially outwardly from said inner wall;
   an outer case having cylindrical outer wall configured for receipt in a housing and a rim extending radially inwardly from said outer wall;
   an elastomeric body attached to said rim, said elastomeric body including a main seal lip that engages said outer running surface and a plurality of thrust pads extending axially from said rim toward said flange, said thrust pads having peaks forming thrust surfaces along a first diameter, said peaks of said thrust pads being spaced circumferentially from one another by valleys, said elastomeric body further including a first dust exclusion lip extending axially from the leg and bridging the valleys between said peaks of said thrust pads, said first dust exclusion lip having a free end extending along said first diameter.

2. The dynamic radial shaft seal assembly of claim 1 wherein said first dust exclusion lip merges with said thrust surfaces.

3. The dynamic radial shaft seal assembly of claim 1 wherein said thrust pads are circumferentially interconnected with one another by circumferentially extending undulating surfaces extending axially inwardly toward said rim.

4. The dynamic radial shaft seal assembly of claim 3 wherein said first dust exclusion lip extends axially from said undulating surfaces toward said flange.

5. The dynamic radial shaft seal assembly of claim 3 wherein said first dust exclusion lip is radially aligned with said undulating surfaces.

6. The dynamic radial shaft seal assembly of claim 1 wherein said thrust pads extend radially outwardly from said first dust exclusion lip.

7. The dynamic radial shaft seal assembly of claim 1 further including a secondary dust exclusion lip spaced radially inwardly from said first dust exclusion lip.

8. The dynamic radial shaft seal assembly of claim 1 wherein said first dust exclusion lip undulates radially between said thrust pads.

9. The dynamic radial shaft seal assembly of claim 8 wherein said first dust exclusion lip extends over a substantially sinuous, circumferential path.

10. The dynamic radial shaft seal assembly of claim 8 further including a secondary dust exclusion lip spaced radially inwardly from said first dust exclusion lip.

11. The dynamic radial shaft seal assembly of claim 10 wherein said first and second dust exclusion lips are circumferentially uniformly spaced from one another.

* * * * *